(12) United States Patent
Borgese et al.

(10) Patent No.: US 11,814,129 B2
(45) Date of Patent: Nov. 14, 2023

(54) SUSPENSION SYSTEM FOR ARRANGEMENT WITHIN A STEERING HEAD TUBE OF A BICYCLE

(71) Applicant: HIRIDE SUSPENSION S.R.L., Milan (IT)

(72) Inventors: Domenico Borgese, Milan (IT); Luca Ceresoli, Ranica (IT); Fabio Noce, Luisago (IT)

(73) Assignee: HIRIDE SUSPENSION S.R.L., Milan (IT)

( * ) Notice: Subject to any disclaimer, the term of this patent is extended or adjusted under 35 U.S.C. 154(b) by 370 days.

(21) Appl. No.: 17/250,357

(22) PCT Filed: Jul. 8, 2019

(86) PCT No.: PCT/IB2019/055791
§ 371 (c)(1),
(2) Date: Jan. 8, 2021

(87) PCT Pub. No.: WO2020/012324
PCT Pub. Date: Jan. 16, 2020

(65) Prior Publication Data
US 2021/0316812 A1    Oct. 14, 2021

(30) Foreign Application Priority Data
Jul. 10, 2018   (IT) .................. 102018000007054

(51) Int. Cl.
*B62K 21/20*    (2006.01)
*B62K 19/32*    (2006.01)

(52) U.S. Cl.
CPC ............. *B62K 21/20* (2013.01); *B62K 19/32* (2013.01)

(58) Field of Classification Search
CPC ................................ B62K 21/20; B62K 19/32
See application file for complete search history.

(56) References Cited

U.S. PATENT DOCUMENTS

| | | | | |
|---|---|---|---|---|
| 4,815,763 A | * | 3/1989 | Hartmann | B62K 21/20 280/275 |
| 4,881,750 A | * | 11/1989 | Hartmann | B62K 21/20 188/269 |

(Continued)

FOREIGN PATENT DOCUMENTS

| | | |
|---|---|---|
| DE | 202007007190 U1 | 8/2007 |
| DE | 202009002050 U1 | 8/2009 |
| WO | WO-2020012324 A1 | 1/2020 |

OTHER PUBLICATIONS

International Search Report and Written Opinion for International Application No. PCT/IB2019/055791, European Patent Office, Netherlands, dated Oct. 7, 2019, 12 pages.

*Primary Examiner* — Minnah L Seoh
*Assistant Examiner* — Michael R Stabley
(74) *Attorney, Agent, or Firm* — STERNE, KESSLER, GOLDSTEIN & FOX P.L.L.C.

(57) ABSTRACT

The present invention is in connection with the field of the cycling industry, and in particular it refers to a front suspension system of a bicycle, of the single-stem type, thus adapted to be arranged inside the steering head tube and specially conceived, thanks to its compactness, to equip road "racing" bikes but not exclusively intended for this category of bicycles.

17 Claims, 3 Drawing Sheets

(56) References Cited

U.S. PATENT DOCUMENTS

| | | | | |
|---|---|---|---|---|
| 5,163,697 | A | * | 11/1992 | Kastan ................... B62K 21/20 |
| | | | | 280/276 |
| 5,308,099 | A | * | 5/1994 | Browning .............. B62K 21/20 |
| | | | | 403/328 |
| 5,320,374 | A | | 6/1994 | Farris et al. |
| 5,509,676 | A | * | 4/1996 | Fukutake ............... B62K 25/08 |
| | | | | 280/276 |
| 5,911,428 | A | * | 6/1999 | Ueda ...................... B62K 21/20 |
| | | | | 280/276 |
| 6,916,033 | B2 | * | 7/2005 | Yih ........................ B62K 21/20 |
| | | | | 280/279 |
| 7,562,889 | B2 | | 7/2009 | Cauwet |
| 9,085,337 | B2 | * | 7/2015 | Jordan ................... B62K 21/20 |
| 9,926,033 | B1 | * | 3/2018 | Tsai ....................... B62K 21/20 |
| 9,994,279 | B2 | * | 6/2018 | D'Aluisio .............. B62K 21/20 |
| 10,526,035 | B2 | * | 1/2020 | D'Aluisio .............. B62K 21/20 |

* cited by examiner

SUSPENSION SYSTEM FOR ARRANGEMENT WITHIN A STEERING HEAD TUBE OF A BICYCLE

FIELD OF THE INVENTION

The present invention is in connection with the field of the cycling industry, and in particular it refers to a front suspension system of a bicycle, of the single-stem type, thus adapted to be arranged inside the steering head tube and specially conceived, thanks to its compactness, to equip road "racing" bikes but not exclusively intended for this category of bicycles.

BACKGROUND OF THE INVENTION

In road bicycles, for instance and in particular the so-called "racing" bikes (a category that includes not only the bikes designed to true racing, but also those conceived to support medium- or long-range rides at relatively fast speed in a sportive/amateur or simply touristic context), the need for reducing the weight and bulk of the vehicle is strongly felt, because these factors particularly affect the objective and perceived performance of this kind of bikes.

Considering this design constraint, the manufacturers in this field are nevertheless called to face the problem of a comfortable use of the bike, and in this connection to provide the vehicle with suspension systems (i.e. spring-damper units). In other types of bicycles, in particular the mountain bikes, the above cited constraint is less severe, both because the rewired speed and kind of performances are on average such that the aerodynamics and lightweight factors are less critical, and because in any case a full reliability and maximum effectiveness of the suspension system prevail over any other demands.

On the other hand, a certain damping capability of the frame is becoming more and more requested also in road racing bikes, that one has to ride on tarmac terrains that are far from being indeed smooth. Furthermore, users are more and more appreciating the possibility to venture, with this same type of bike, in gravel roads or even easy off-road tracks, thanks to a bike that has a special versatility; this type of considerations have led to the recent popularity of the so-called "gravel" bikes. These bikes, but also the vehicles conceived for bikepacking, or the endurance bikes, particularly adapted to give to (even elderly) amateurs the possibility to enjoy long distance rides, find right in their use comfort a key quality that has to be ensured without affecting significantly, or in any case to an unacceptable extent, the speed performance and more generally the efficiency of the vehicle.

In this context, it is then fundamental to propose solutions that ensure an appreciable damping function without weighing down the bike or impairing its aerodynamic profile. A solution to which, based on these considerations, some efforts have been directed, is the one which envisages a single-stem suspension housed and in fact concealed inside the steering head tube of the bicycle frame. A disclosure that follows this design concept is that described in U.S. Pat. No. 5,320,374. The suspension disclosed therein provides that from the fork there rises an internal steering tube with a polygonal section on the faces of which linear roller bearings are arranged, allowing a telescopic movement in the axial direction between the same tube and a correspondingly internally faceted outer tube segment, in turn revolving, on its external surface, in the steering head tube of the bicycle frame.

This arrangement, with needle bearings arranged on the flat sections between the internal and the outer steering tubes, allows the two tubes to slide freely between them in an axial direction without any significant static friction, but at the same time it has to transmit the torsional steering force from the outer tube to the internal one. The needle bearings therefore support radial loads and maintain an aligned relationship between the two tubes with respect to rotation forces, while allowing the two tubes to slide freely. This freedom of axial movement can therefore be exploited to associate a spring/shock absorber assembly to the system. However, this solution cannot be considered as satisfactory, in a number of aspects among which one can mention precision defects, frictions that are not reduced enough, maintenance problems.

Another known solution is the one disclosed by document DE2009002050U1, according to which, in an arrangement that provides suspension means, the function of steering transmission, carried out via a prismatic coupling, and a slidable coupling provided through a single axial bearing spaced upwards with respect to the prismatic coupling, are cinematically unlinked and distanced along the steering axis. This arrangement remains however still inadequate, in that it does not accomplish the required dynamic smoothness between the main components of the suspension, and it is not reliable in terms of structural strength.

Accordingly, and more generally in consideration of the remarks above in connection with the design context, there is a strong need for conceptually different solutions that permit to attain a full and satisfactory application of suspension/shock absorber systems inside the steering head tube.

SUMMARY OF THE INVENTION

Such a need is responded to by the suspension system for arrangement within a steering head tube of a bicycle according to the invention, having the essential characteristics defined by the first claim here attached. Further advantageous features are defined by the dependent claims.

BRIEF DESCRIPTION OF THE DRAWINGS

The characteristics and the advantages of the suspension system for arrangement within a steering head tube of a bicycle according to the invention will become apparent from the following description of an embodiment thereof, given as a non-limiting example, with reference to the attached drawings in which:

FIG. 1 is a longitudinal cross section view (that is, taken on a plane that contains the longitudinal axis of the device) of a steering head tube in which a suspension system according to the invention is mounted, an enlargement of the central region being shown in FIG. 1a;

DETAILED DESCRIPTION OF THE INVENTION

With reference to the above figures, according to a main aspect of the present invention it is envisaged essentially that the sliding of an internal steering tube (or stem) fixed to the fork (the fixing will be discussed hereafter), with respect to the frame head tube—a sliding which is functional to the effect of damped suspension exercised by means of appropriate spring and shock absorber components—and the transmission to the stem of the steering drive, further to a steering torque imparted to an outer sheath, are respective tasks of two functional groups physically distinct from each other (i.e. consecutive) along the steering axis, and cinematically unlinked.

According to this aspect, a suspension system that comprises the outer sheath and the internal stem, which considered together represent a steering column segment inserted in the head tube of the frame, are made integral with respect to rotation—so as to transmit the steering drive from the handlebar to the fork—via a prismatic coupling defined e.g. between a guide sleeve locked to the stem and at least one radial block locked to the sheath; the axial sliding coupling between the components is instead provided by first and second linear bearing means axially consecutive with respect to the guide sleeve.

Figure 1:
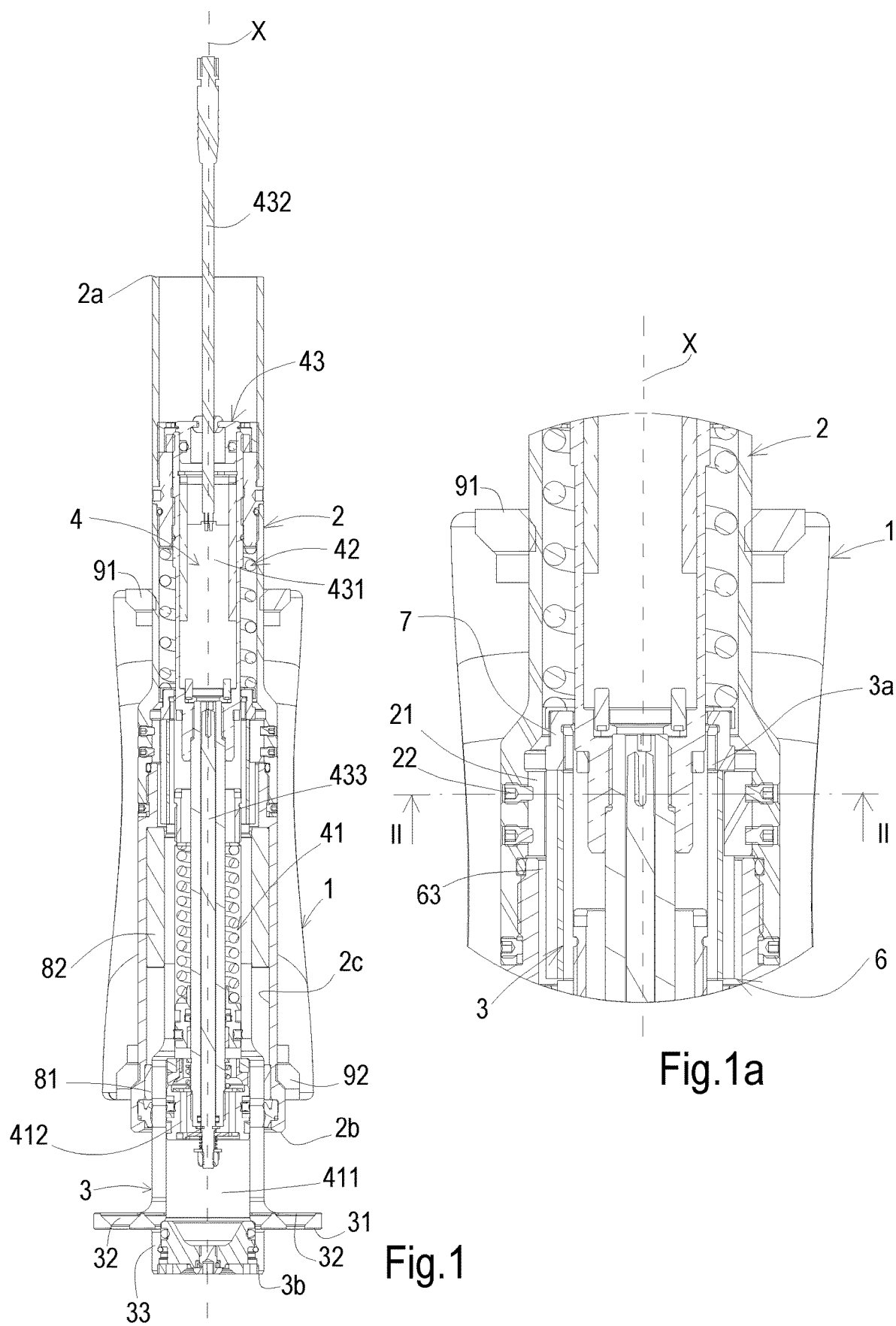

With reference, for the time being, in particular to FIGS. 1 and 1a, the following main components can be noticed:
- a steering head tube 1, that extends according to a central axis X, which represents the steering axis and at the same time the longitudinal axis of the suspension system; the head tube is part of a bicycle frame, not shown and configured according to any known geometry, being it in any case an interface element outside the scope of the invention;
- a suspension system comprising: a tubular sheath 2 and a stem 3, in turn tubular, coaxially arranged the latter inside the former, and the former (i.e. the sheath) inside the head tube 1, all by sharing the common central axis X; and, furthermore, active components 4 operatively arranged between the stem and the sheath, adapted to carry out the function of elastic countering and dampening of the relative axial motion between the two parts just mentioned; these active components 4, which in any case will be briefly described hereafter, does not form part of the invention, this meaning that they can be configured according to features well known and used in the field and that, as will result even clearer from the following description, do not have any significant role in the understanding of the invention and of its enablement.

Going further into detail, the sheath 2 is rotatably coupled (and axially locked) to the head tube 1 through roller bearings 91, 92 of a type similar to that commonly used in known steering systems. A top end 2a of the sheath 2 is connected, again with traditional techniques, a handlebar of the bicycle, not shown and adapted to impart to the sheath the steering torque around the axis X. From the constructive point of view, the sheath 2 is here advantageously manufactured in three axially consecutive portions, connected to each other by threading.

The stem 3 is, as mentioned, mounted to the sheath 2 so as to ensure axial sliding with respect to it, although being secured to it with respect to rotation, to transmit the steering torque to a fork 5 connected to a lower end 3b of the stem, with a preferred arrangement which will be discussed in detail below. This lower end is external with respect to the sheath, and from a lower end 2b of the sheath the stem protrudes for a segment that in use will be variable according to the excursion imposed on the suspension system.

Figure 2:
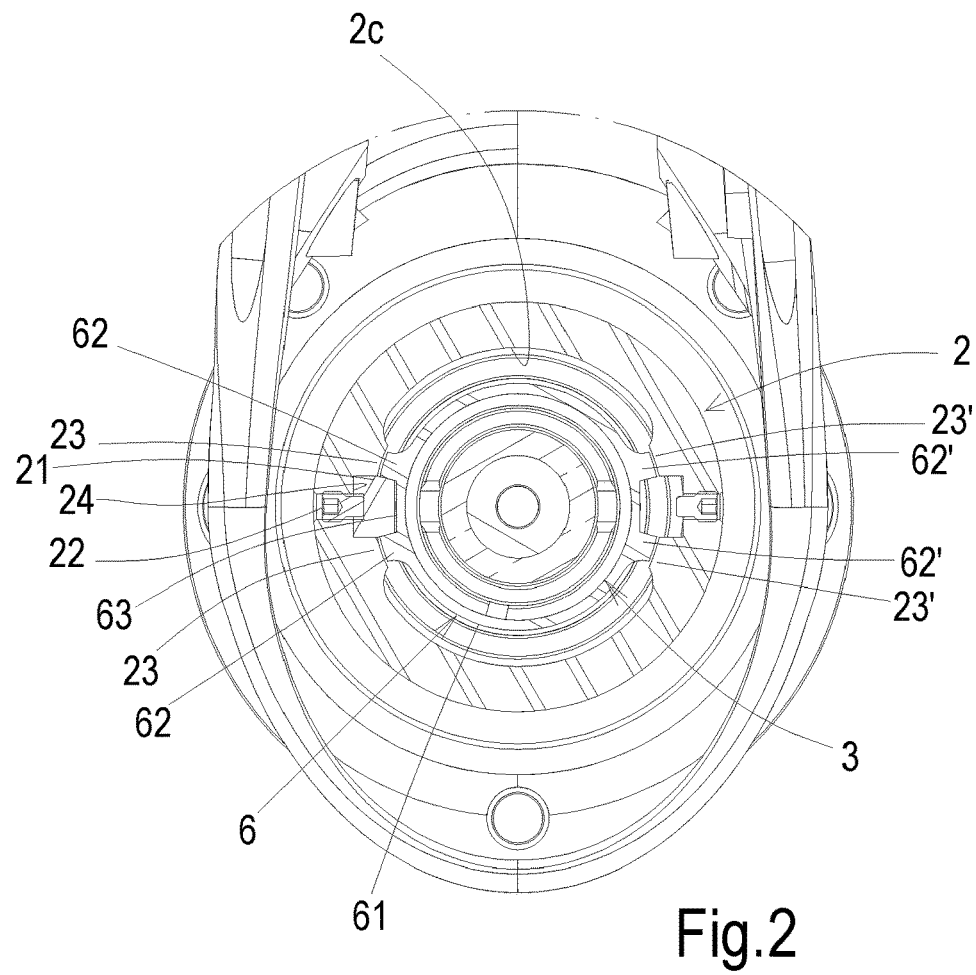
FIG. 2 is a cross section view of the assembly of FIG. 1, taken cross-wise, and more precisely according to the plane indicated by the arrows II-II in FIG. 1a, with parts omitted.

The guide sleeve through which the prismatic coupling is materialized is indicated as a whole with 6 and shown in particular in FIG. 2. It advantageously provides a substantially cylindrical sleeve body 61, with an outer side surface 61a. At least two first parallel ridges 62 of longitudinal development radially protrude from the side surface 61a, mutually spaced in the circumferential direction to define a groove 63. For obvious reasons of balancing the stresses, at least one further ridge or a further pair of parallel ridges 62' is replicated at least in a diametrically opposite position with respect to that of the first ridges 62.

At least the groove 63 acts as a sliding channel for at least one adjustable block 21 which protrudes radially inwards from an inner side surface 2c of the sheath. This block 21 is connected to the sleeve through connection means which allow the adjustment of the radial penetration of the block itself inside the groove 63. For example and preferably at least one adjusting set screw 22 can be provided, to which the screwing rotation can be impressed from the outside of the sheath, the radial movement of the block responding to such rotation. This adjustment can be used to optimize the sliding friction and the steering precision, during assembly or maintenance, also to recover some play that can be generated as a result of wear. Again advantageously, the cross sections of the groove and of the block, mutually matching with each other, as shown in FIG. 3, may have side faces that converge to some extent in a wedge fashion.

Still in a preferred solution, that can be well understood especially from FIG. 2, radial end facets 62a of the first ridges 62 (and likewise of the further possible ridges 62') act as radial stop and reference for corresponding radial end facets of ridges 23 (and 23') projecting in a corresponding and mirrored fashion and position from the inner side surface 2c of the sheath 2. The ridges 23 also define at least one groove 24 within which the block 21 is housed. In the example here shown, there are two pairs of ridges facing each other between the sleeve and sheath, one of which serves to the operative arrangement of the sliding block 21.

Figure 3:
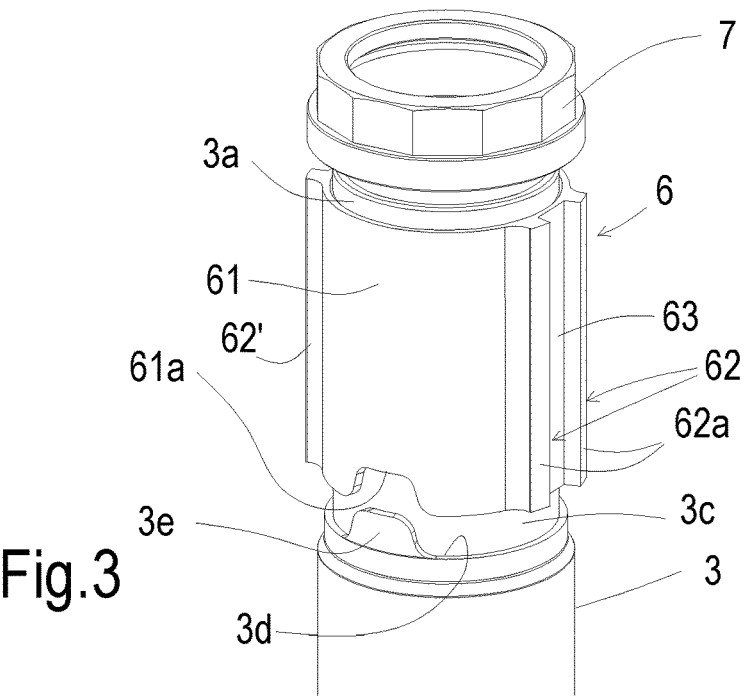
FIG. 3 is an axonometric and exploded view of a core region comprising in particular a guide of the suspension system of the previous figures.

The sleeve 6 is axially locked to the outer side surface 3c of the stem 3, as shown in FIG. 3, at an upper end region 3a of the stem itself, between a step 3d and a blocking ring nut 7. The step 3d develops also according to at least one axial tooth 3e that, by engaging with a corresponding axial cutout 61a of the sleeve 6, prevents the latter from rotating around the axis X.

The linear/axial sliding coupling between the stem 3 and the sheath 2 is provided (FIG. 1) by first and second linear bearing means 81, 82 arranged at different heights, and in particular at the lower end 2b of the sheath 2 and at a certain distance above, adjacent to the sleeve 6. Advantageously a lower bearing 81 with sliding friction and an upper recirculating ball bearing 82 are provided.

It is already apparent from the foregoing that according to the invention, from an operative point of view, a sure block against the mutual rotation is provided by the engagement between the block and the guide sleeve, permitting the transfer to the stem of the steering torque imparted to the sheath, and at the same time a reciprocating linear movement between such components, supported by the two linear bearings, with outstanding smoothness and precision, this second merit being in particular due to the spacing of the bearings that effectively constrain the stem, preventing significant flexion deformations. The fact that the two mentioned functions are not only cinematically unlinked thanks to components that are distinct and separated along the X axis, but also and in particular through first and second linear bearing means that are axially consecutive with respect to the prismatic coupling means, permits then to attain a particularly balanced force field that at the same time improves the performance (ensuring maximum sliding smoothness) and guaranteeing extreme structural strength, this being a fundamental requirement for a fork that must be compliant with regulations that imply overcoming numerous static stress and fatigue tests.

Durability of the system is also enhanced, obtaining remarkable improvements also as far as the ease of mounting and maintenance is concerned, considering that, among other things, it is possible to easily disengage the sleeve from the stem, and actually dismount the whole suspension to replace worn out or damaged components.

Returning briefly, for the sake of completeness, to the active components 4, these can comprise, as in the example and always with specific reference to FIG. 1 in which the stem is in the position of maximum external excursion: a hydraulic damping group 41 provided inside the stem, which uses a chamber 411 occupied by a viscous fluid (oil) within which the relative movement of a piston 412, secured to the sheath, is allowed (but damped) by the effect of the transfer of fluid through controlled passages provided on the piston itself; a main spring 42 arranged within the sheath in the upper part not occupied by the stem, and stressed by the excursion stroke of the stem itself, the spring being accessible by removing the components mounted above it to modify its static preload or to replace it with another of different stiffness; a group 43 for exclusion or calibration of damping group 41, again extending inside the stem-sheath assembly between the same group 41 and the upper part of the sheath, and comprising a small gear motor 431 powered by a cable 432 for connection to a control unit control (typically on the bicycle handlebar) and able to exert a selective shutting action on the piston passages by means of a rotating rod 433, until the stem/sheath excursion is blocked—if desired—and the function of suspension is in practice disabled. All these components, or other equivalent or even of different performances, can be adopted and adapted on the basis of known technical teachings, this adaptation being by no means affected by any particular problem posed by the specific aspects of the present invention. These known teachings obviously include the constructional arrangements for the various hydraulic seals, not only with respect to the fluid of the damping system, but also imposed by lubrication requirements.

Figure 4A:
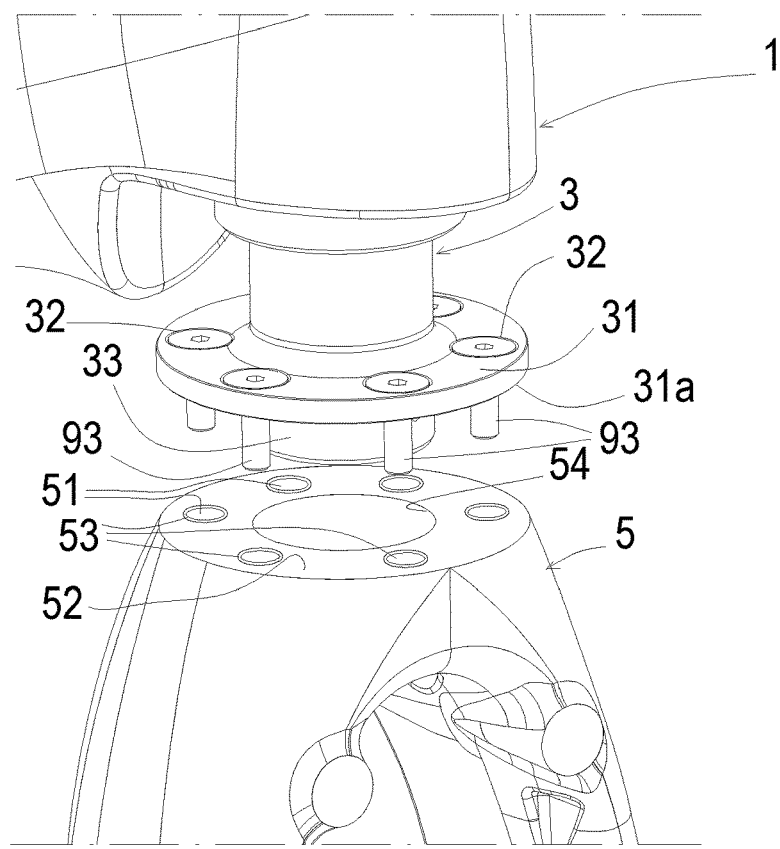
FIGS. 4a and 4b are axonometric views of a connection region between an inner stem of the suspension system and the fork of a bicycle, respectively in a mounting exploded arrangement and in a mounted arrangement.
Figure 4B:
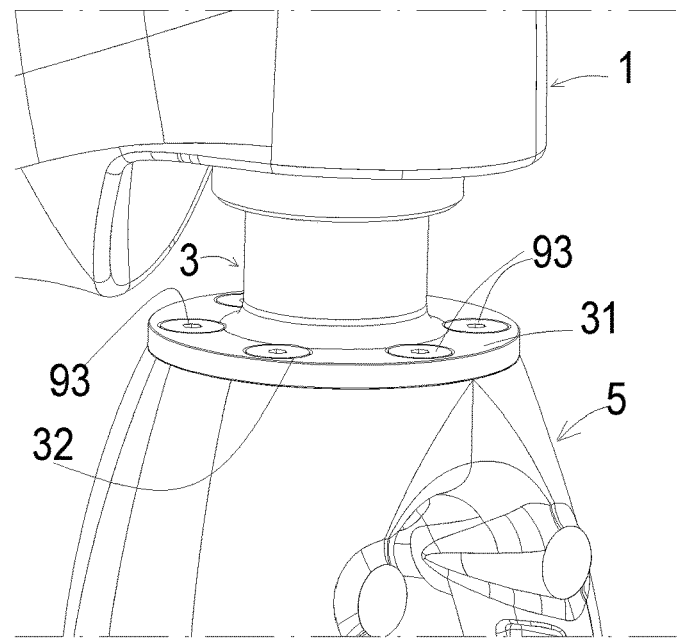

An embodiment that has a synergic effect with man aspect of the invention discussed in the foregoing description relates to the connection of the lower end 3b of the stem 3 to the fork 5. With particular reference to FIGS. 4a and 4b, the stem at the lower end 3b is shaped according to a disc-shaped flange 31, comprising a bottom flat face 31a which extends orthogonally to the axis X. A plurality of flared seats 32 are formed in the flange, arranged in a crown preferably in an equally spaced manner along a closed path, such as a circular one centered on the axis X. The seats are for example and preferably in a number of six, and adapted to receive the heads of respective fixing screws 93 arranged parallel to the axis. The screws are for example and preferably of size M5.

The screws 93 are adapted to be engaged in threaded holes 51 formed with a suitable distribution that corresponds to that of the seats of the flange, at the top of the fork 5, more precisely on a to flat face 52 providing abutment to the bottom flat face 31a of the flange 31. The holes 51 therefore open at the top flat face 52 and are blind. The fork, according to commonly used techniques, can be made of typical materials such as steel, aluminum or carbon fiber. If the fork is made of carbon fiber, the threaded holes 51 are preferably made of aluminum inserts 53, embedded in the matrix during the piece lamination working.

On the top flat face of the fork at least one centering cavity 54 is provided, preferably a single large circular hole in a central position with respect to the distribution of holes 51, for the engagement of at least one corresponding centering shaft 33 (FIG. 4a) that the stem 3 forms as an axial protrusion from the bottom face 31a of the flange 31, this engagement being established when the flange is in stop abutment with its bottom face 31a on the flat face 52. Advantageously, the stem body, the flange and the shaft are obtained in one integral piece; in any case, these components, and in particular the stem and the flange, are fixed together in a locked relationship.

The shaft 33, besides to having the centering task, internally houses some of the active components mentioned above, in particular the lower part of the hydraulic chamber 411, so as to exploit and optimize the available spaces as far as possible.

To summarize, it will be appreciated how, according to the invention, there is provided a solution that ensures full integration inside a steering head tube of a compact and functional arrangement, likewise achieving high levels of precision, reduced friction, ease of mounting and maintenance.

The present invention has been so far described with reference to its preferred embodiments. It has to be understood that other embodiments may exist which belong to the same inventive concept as defined by the scope of the protection of the claims here enclosed.

The invention claimed is:

1. A suspension system for a bicycle, adapted to be arranged within a steering head tube of a frame of said bicycle, said head tube centrally defining a steering axis, said system comprising: a sheath adapted to be connected to a bicycle handlebar and to be pivotally engaged within said head tube, coaxially with said axis; a stem engaged inside said sheath and externally protruding from the sheath at least with a lower end portion which comprises stem fixing means for fixing the stem to a bicycle fork; a coupling means between said stem and said sheath comprising sliding coupling means adapted to permit the sliding of said stem with respect to said sheath along said axis, and a prismatic coupling means adapted to permit the transmission of a steering torque around said axis from said sheath to said stem; and active components operatively arranged between said stem and said sheath, adapted to carry out the function of elastic countering and dampening of the axial motion of the stem relative to the sheath, wherein said sliding coupling means and said prismatic coupling means are cinematically unlinked and physically distinct along said axis, wherein said sliding coupling means comprise first and second linear bearing means axially consecutive with respect to said prismatic coupling means;

wherein said prismatic coupling means comprise a guide sleeve locked to said stem around an outer side surface thereof, and at least one sliding radial block locked to said sheath, said axial coupling means comprising bearing means at an axially consecutive position with respect to said guide sleeve;

wherein said guide sleeve comprises a substantially cylindrical tubular body, from the outer side surface of which at least two first, longitudinally developing, parallel ridges project, said ridges being spaced so as to define a groove, said groove acting as a sliding track for said at least one sliding block projecting from an inner side surface of said sheath; and wherein radial end facets of at least said first edges are adapted to radially stop and refer respective radial end facets of sheath edges, projecting in a corresponding and mirrored fashion and at corresponding positions from said inner side face of the sheath, also the sheath ridges defining at least one sheath groove with which said at least one sliding block is fixed.

2. The system according to claim 1, wherein at least a further ridge or a further couple of parallel ridges is formed on said sleeve at least at a diametrically opposed position with respect to the position of said first ridges.

3. The system according to claim 1, wherein said at least one sliding block is connected to said sheath through connection means adapted to permit an adjustment of the radial penetration of the block inside said groove.

4. The system according to claim 3, wherein said connection means connecting said at least one sliding block and said sheath comprise at least one adjustment set screw adapted to be screwed or unscrewed from the outside of the sheath, the screwing/unscrewing rotation driving a radial displacement of the block.

5. The system according to claim 1, wherein crosswise sections of said groove of said sleeve and of the respective at least one sliding block show mutually matching side faces, convergent in a wedge fashion.

6. The system according to claim 1, wherein said sleeve is axially blocked on said outer side surface of the stem at an upper end region of the stem, between a step and a blocking ring nut, said step developing according to at least one axial tooth that by engaging with a corresponding axial cutout of the sleeve prevents the latter from turning around said axis.

7. The system according claim 1, wherein said first and second linear bearing means are arranged respectively in correspondence of a lower end of said sheath and at an upwards displaced height, adjacent with said prismatic coupling means.

8. The system according to claim 1, wherein said first and second linear bearing means comprise respectively a lower sliding bearing, and an upper recirculating ball bearing.

9. The system according to claim 1, wherein said stem fixing means for fixing the stem to the fork comprise: at said lower end portion, a flange fixed with the stem and provided with a bottom flat face orthogonal with said axis, adapted to abut on a fork top flat face provided on said fork; a plurality of seats distributed over said flange along a closed path centered on said axis, adapted to receive heads of respective fixing screws to be screwed in respective blind threaded holes that open at said fork top flat face; and at least one centering shaft axially protruding from said stem bottom flam face and adapted to become inserted in a corresponding centering cavity formed in said fork top flat face when said stem bottom face stops against said fork top face.

10. The system according to claim 9, wherein said seats of said flange are equally spaced along a substantially circular path.

11. The system according to claim 10, wherein said seats are six in number.

12. The system according to claim 10, wherein said at least one centering shaft is a single shaft arranged at the center of said substantially circular path, and is adapted to become engaged in a cavity centrally formed in said fork top flat face.

13. The system according to claim 10, wherein said centering shaft is hollow and houses part of said active components.

14. The system according to claim 10, wherein said flange and said centering shaft are obtained in a single piece with a body of said stem.

15. The system according to claim 9, wherein said seats are countersunk alike the heads of the respective screws.

16. The system according to claim 9, wherein said flange is disk-shaped.

17. A bicycle comprising the system according to claim 9 and a fork comprising fixing means for fixing the fork to a lower end portion of said stem, wherein said fork fixing means comprise a fork top flat face adapted to act as a contact abutment for said stem bottom face, a plurality of threaded holes formed in said fork flat face, adapted to receive respective fixing screws, and at least one centering cavity formed in said fork flat face, adapted to engage with said centering shaft.

* * * * *